United States Patent [19]

Duggal

[11] Patent Number: 5,602,800
[45] Date of Patent: Feb. 11, 1997

[54] METHODS FOR ULTRASONIC/VIBRATION DETECTION USING POLARIZATION BEATING IN A MICROCHIP LASER

[75] Inventor: Anil R. Duggal, Schenectady, N.Y.

[73] Assignee: General Electric Company, Schenectady, N.Y.

[21] Appl. No.: 415,967

[22] Filed: Apr. 3, 1995

[51] Int. Cl.$^6$ .............................. H04R 23/00; G01B 9/02
[52] U.S. Cl. ............................ 367/149; 73/657; 356/349; 356/351
[58] Field of Search ............................ 367/149; 356/349, 356/351; 73/653, 655, 657; 372/20, 23, 28, 27

[56] References Cited

U.S. PATENT DOCUMENTS

| | | | |
|---|---|---|---|
| 3,808,557 | 4/1974 | Smiley | 356/349 |
| 4,449,825 | 5/1984 | May | 356/349 |
| 5,353,262 | 10/1994 | Yakymyshyn et al. | 367/149 |

OTHER PUBLICATIONS

"Stress–Induced Tuning of a Diode–Laser–Excited Monolithic Nd:YAG Laser," Adelbert Owyoung; Peter Esherick, Optics Letters, vol. 12, No. 12, Dec., 1987, pp. 999–1001.
"Diode–Pumped Microchip Lasers Electro–Optically Q Switched at High Pulse Repetition Rates," J J Zayhowski; C. Dill III, Optics Letters, vol. 17, No. 17, Sep., 1992, pp. 1201–1203.
"Polarization–Switchable Microchip Lasers," J J Zayhowski, Appl. Phys. Lett. 58 (24), 17 Jun., 1991, pp. 2746–2748.
"High–Resolution Force Sensing by a Diode–Pumped Nd:YAG Laser," Wolfgang Holzapfel, Martin Finnemann, Optics Letters, Vol. 23, No. 18, Dec., 1993, pp. 2062–2064.

*Primary Examiner*—Ian J. Lobo
*Attorney, Agent, or Firm*—William H. Pittman

[57] ABSTRACT

Methods for ultrasonic/vibration detection include using a sensor consisting of a microchip laser or an array of microchip lasers constructed to oscillate at two different laser frequencies corresponding to two orthogonal polarizations is disclosed. The frequency difference between these two different frequencies is chosen to be within the bandwidth of an electrical (as opposed to optical) signal processing system. When the microchip laser or microchip laser array is placed in an acoustic field, its cavity length is modulated which causes a frequency modulation of the frequency difference between the two modes. When the two laser output polarizations are mixed using a polarization scrambling device such as a polarizer at about 45 degrees to the polarization axes and then detected with a photodiode, one for each microchip laser, the resulting electrical signal contains the FM modulated beat frequency between the two polarization modes. This is then demodulated using an electrical signal processing system.

9 Claims, 3 Drawing Sheets

METHODS FOR ULTRASONIC/VIBRATION DETECTION USING POLARIZATION BEATING IN A MICROCHIP LASER

BACKGROUND OF THE INVENTION

This application is related to commonly assigned U.S. Pat. application Ser. No. 08/415,968, (RD-23,611) filed Apr. 3, 1995, of A. R. Duggal, filed concurrently herewith, the disclosure of which is hereby incorporated by reference.

This invention relates generally to methods of imaging of acoustic energy, more particularly to methods of imaging acoustic energy using laser-based ultrasound detection equipment and most particularly to methods of imaging acoustic energy using Polarization Beating in a microchip laser.

Ultrasound equipment is commonly used in medical imaging and for non-destructive evaluation of materials. Ultrasound analysis involves the propagation of energy through solids, liquids, and gases as acoustic waves; typically a pulse of acoustic energy is applied to an object to be imaged and reflected waves of the acoustic pulse are detected and processed for imaging and analysis. The spatial relationship and amplitude of the reflected waves provide information as to the location and nature of structures that reflected the acoustic energy in the object being analyzed.

Piezoelectric transducers are frequently used to generate ultrasound pulses transmitted into the object to be analyzed and to detect reflected waves received at the transducer. Piezoelectric devices require extensive electrical cabling which places practical limits on the number of pixels that can be placed in a transducer array, which in turn limits the resolution of the array.

Optical techniques have also been used for generation and detection of acoustic waves in ultrasound imaging. For example, energy from a laser beam focused on the surface of an object to be examined can generate an acoustic pulse in the object. The return pulse of acoustic energy is typically detected optically through the use of interferometry. A review of such techniques is provided in the book *Laser Ultrasonics—Techniques and Applications* by C. B. Scruby and L. E. Drain (IOP Publishing Ltd 1990), which is incorporated herein by reference. Nonintederometric techniques of optical detection of ultrasound include the knife-edge and surface-grating techniques and techniques based on reflectivity and light filters. See "Optical Detection of Ultrasound" by J. P. Monchalin, *IEEE Transactions on Ultrasonics, Ferroelectrics and Frequency Control*, UFFC-33, September 1986, which is incorporated herein by reference. These laser-based methods of ultrasound detection are much less sensitive, by several orders of magnitude, than conventional piezoelectric-based methods.

Another laser-based method for detecting sound waves has been suggested in the article "Laser Hydrophone" by Y. A. Bykovskii et al., in *Sov. Phys. Acoust.* 34, p. 204, March 1988. In the Bykovskii et al. optical hydrophone, movement of the hydrophone membrane varies the power and/or the phase of a semiconductor laser in the hydrophone to generate changes in the amplitude of an optical signal. The Bykovskii sonar hydrophone is relatively inefficient and thus has low sensitivity.

In a more recent approach to the use of an optical transducer assembly for ultrasound applications, as disclosed in U.S. Pat. No. 5,353,262, assigned to the assignee of the present application, the disclosure of which is herein incorporated by reference, an optical transducer assembly includes a transducer housing and a signal laser mounted in the transducer housing. The optical frequency generated by the signal laser is modulable (that is, adapted to or capable of being modulated) in correspondence with acoustic energy incident on the transducer assembly. The signal laser comprises an optical cavity in which a lasing medium is disposed, and first and second reflectors that are disposed at respective opposite end surfaces of the optical cavity along an optical path axis of the cavity. The second reflector can alternatively be replaced with a compliant cavity that acts as a Gires-Tournois interferometer. The signal laser is adapted such that acoustic energy incident on the transducer assembly changes the length of a cavity along the optical path axis, or, alternatively, changes the index of refraction in the optical cavity, and such changes result in a substantially linear variation of the optical frequency of light generated by the laser.

In one embodiment, as disclosed in U.S. Pat. No. 5,353,262, the signal laser is mounted in the transducer housing such that acoustic energy incident on the transducer assembly is transmitted along the optical path axis of the optical cavity causing alternating compression and rarefaction of the optical cavity, thereby varying the length of the optical cavity and consequently varying the frequency of light generated by the signal laser. In another embodiment, a compliant cavity that is a Gires-Tournois interferometer is coupled to the lasing medium in lieu of the second reflector such that changes in the incident acoustic energy cause variations in the length of the compliant cavity, which in turn causes a change in the effective optical cavity length of the signal laser with a resultant modulation of the optical frequency of the laser.

In a further alternative embodiment, the signal laser is adapted such that incident acoustic energy is translated into a change in the index of refraction along the optical path between the first and second reflectors such that the optical frequency generated by the signal laser varies in correspondence with the incident acoustic energy. In this embodiment, a piezoelectric device is typically disposed to receive the incident acoustic energy and generate a corresponding electrical signal. The piezoelectric device is electrically coupled to conductors to apply an electric field across the lasing medium. The lasing medium is typically adapted such that variations in the electric field generate a corresponding change in the index of refraction of the lasing medium. Alternatively, the piezoelectric device is coupled to drive an electro-optic device disposed in the optical path and the electro-optic device is adapted to cause a change in the index of refraction.

A laser pump is coupled to the signal laser and is adapted to provide a selectable level of excitation energy to the lasing medium to activate the signal laser. In one embodiment of this invention, the signal laser is mounted in the transducer housing to allow displacement along the optical path axis of a medium in a cavity in the signal laser, the amount of displacement being dependent upon the selected level of excitation energy absorbed by the medium. In a transmit mode, the laser pump is adapted to apply sufficient excitation energy to the medium to generate an ultrasound pulse in an object to which it is coupled.

In an ultrasound system, the optical signal generated by the signal laser is typically coupled to a signal processing assembly for display and analysis. The signal processing assembly advantageously comprises heterodyne detection devices, or alternatively, spectral filter detection devices adapted to generate an output signal corresponding to the amplitude of the incident acoustic energy detected by the signal laser.

A method of performing ultrasound analysis of an object comprises the steps of generating an ultrasound pulse in a transducer; communicating the ultrasound pulse into the object; modulating the optical frequency of a signal laser in correspondence with incident acoustic energy, for example, reflections of the ultrasound pulse from the object; and processing the optical signal generated by the laser to generate an output signal corresponding to the detected reflections of the ultrasound pulse.

Despite the efforts described above, there is still a need to develop improved optical sensors for vibration/ultrasound detection. Advantages of optical sensors over standard piezoelectric sensors include insensitivity to electromagnetic interference (EMI) and the ability to be interfaced with fiber-optic cabling. The former advantage has applications in monitoring vibrations in high EMI environments such as in electrical power plants or along electrical power lines. The latter advantage allows suitably sized sensors to be incorporated within composite structures for process and "in-use" vibration monitoring. Additionally, for medical ultrasonic imaging applications, the final image quality is improved in direct relation to the number of sensors or pixels in an array. Presently, the number of sensors in an array is limited by the size of the cables interconnecting the sensor array to a signal processing console. With fiber-optic cabling, which is substantially smaller than electrical cabling, more sensor array elements can be utilized to provide a simpler, more compact ultrasound detection device. Specifically, in medical imaging and nondestructive evaluation (NDE) of materials for an ultrasound transducer interfaced to support equipment current state-of-the-art ultrasound imaging arrays use a linear array of about one hundred separate ultrasound pixels each of which are connected to a separate coaxial cable. Array sizes are currently limited by the complexity of the interconnect cabling. Thus, it is desirable to increase the number of sensors or pixels in a detection device while at the same time reducing the complexity of the interconnecting cabling. For a practical device, it is also necessary that the detection scheme not add excessive complexity in signal conditioning or in signal processing.

SUMMARY OF THE INVENTION

Methods utilizing an ultrasound/vibration sensor consisting of a microchip laser or an array of microchip lasers constructed to oscillate at two different laser frequencies corresponding to two orthogonal polarizations is disclosed. The frequency difference between the two laser frequencies is chosen to be within the bandwidth of an electrical (as opposed to optical) signal processing system. When the microchip laser is placed in an acoustic field, its cavity length is modulated which causes a frequency modulation of the frequency difference between the two modes. When the two laser output polarizations are mixed using a polarization scrambling device such as a polarizer at about 45 degrees to the polarization axes and then detected with a photodiode the resulting electrical signal contains the FM modulated beat frequency between the two polarization modes. This is then demodulated using an electrical signal processing system.

One method of the present invention for detecting acoustic energy incident on a laser assembly includes, oscillating a microchip laser at two different laser frequencies corresponding to two orthogonal polarizations.

Another method of the present invention for performing ultrasound analysis of an object includes, generating an ultrasound pulse, the pulse being generated by the displacement of a lasing medium in a signal laser in response to applied energy; communicating the ultrasound pulse into the object; oscillating a microchip laser at two different laser frequencies corresponding to two orthogonal polarizations; and processing an optical signal to generate a laser output signal corresponding to the detected reflections of the ultrasound pulse.

It is accordingly an object of this invention to provide method for performing ultrasound analysis of an object which includes oscillating a microchip laser at two different laser frequencies corresponding to two orthogonal polarizations.

It is a further object of this invention to provide a method for performing ultrasound analysis of an object using a laser ultrasound apparatus that is relatively compact and adapted to having a large number of transducer pixels in a compact transducer array.

A still further object of this invention is to provide a laser ultrasound apparatus that exhibits high sensitivity and a wide dynamic range.

Other objects and advantages of the invention will be apparent from the following description, the accompanying drawings and the appended claims.

DETAILED DESCRIPTION OF THE INVENTION

Figure 1:
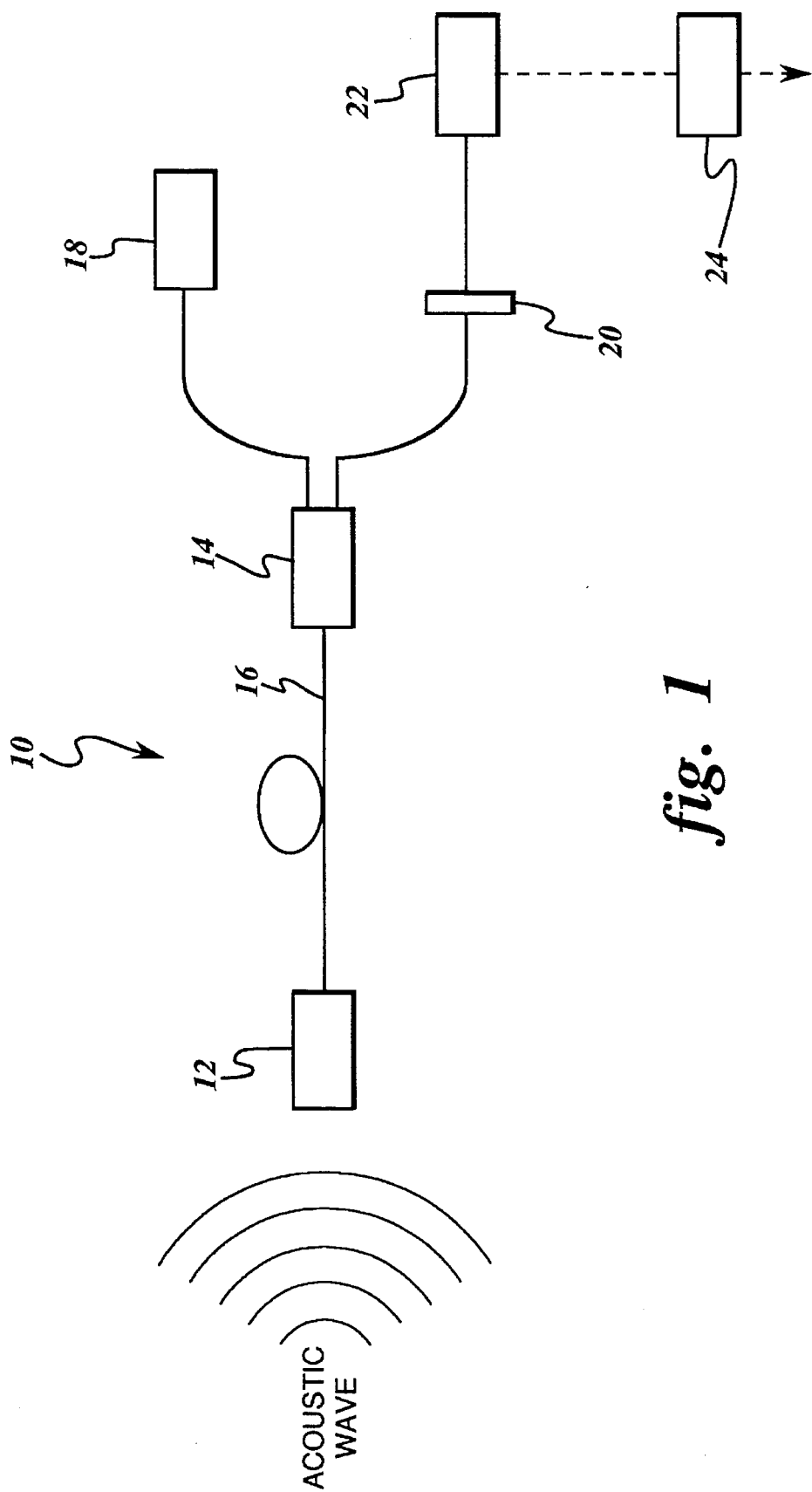
FIG. 1 is a block diagram of an ultrasound system comprising the present invention.

In accordance with the methods of the present invention, microchip laser 12 is adapted to oscillate at two different laser frequencies corresponding to two orthogonal polarizations. The difference between these two frequencies is chosen to be within the bandwidth of an electrical (as opposed to optical) signal processing system. When the microchip laser 12 is placed in an acoustic field, its cavity length is modulated which causes a frequency modulation of the frequency difference between the two modes. When the two laser output polarizations are mixed using a polarization scrambling device such as a polarizer 20 at about 45 degrees to the polarization axes and then detected with a photodiode 22 the resulting electrical signal contains the FM modulated beat frequency between the two polarization modes. This is then demodulated using an electrical signal processing system 24.

An ultrasound system 10 for analyzing an examination object with acoustic energy is shown comprising a microchip laser 12 constructed so that its laser output consists of two different frequencies corresponding to two orthogonal polarization states accomplished by ensuring that the laser resonator is birefringent. This can be accomplished by 1) using a birefringent microchip laser material 2) applying stress to the microchip along a certain axis, (techniques for applying such stress is disclosed in "Stress-induced tuning of a diode-laser-excited monolithic Nd:YAG laser" by A. Owyoung and P. Esherick in *Optical Society of America*, p. 999, December 1987, the disclosure of which is incorporated herein by reference 3) by relying on any residual stresses that may be present in the microchip laser material, or 4) by adding a birefringent material as part of a composite microchip laser cavity. The construction of a composite microchip laser cavity utilizing a birefringent material has been previously demonstrated. (See for example, "Diode-pumped microchip lasers electrooptically Q switched at high pulse repetition rates" by J. Zayhowski and C. Dill III in *Optical Society of America*, p. 1201, Sep. 1, 1992 and "Polarization-switchable microchip lasers" by J. Zayhowski in *American Institute of Physics*, p. 2746, 22 Mar. 1991)

Using one of the above mentioned approaches, the frequency difference between the two polarization states (Vp) can be tuned from 0 to half of the axial mode frequency spacing Vax (Vax=c/(2nL) where c is the speed of light, n is the index of refraction, and L is the microchip laser cavity length). Thus, for a 1 mm Nd:YAG microchip where n=1.8, Vp can be tuned from 0 to 42 GHz.

If a polarization mode scrambler such as a polarizer 20 at about 45 degrees to the polarization axes of the laser output is placed in the path of the light before detection with the photodiode 22, the resulting electrical signal will contain a component at the beat frequency ($V_p$) of the two polarizations.

If the microchip 12 is placed in an acoustic field, this beat frequency will be modulated by the time-dependent change in the macroscopic strain of the microchip caused by the acoustic field according to the following equation:

$$\frac{\Delta V p^{(t)}}{V p} = -\frac{\Delta L^{(t)}}{L}$$

Here, $\Delta Vp(t)$ is the change in beat frequency as a result of the change in microchip laser cavity length $\Delta L^{(t)}$. Thus, the time dependence of the acoustic field is encoded in the FM modulation of the polarization frequency Vp.

A schematic outline of how this invention might be employed is shown in FIG. 1. Here a diode laser 18 with wavelength, $\lambda_1$ is used to pump the microchip through an optical fiber 16 and the microchip laser 12 output at $\lambda_2$ is made to travel in the reverse direction through the same optical fiber. A fiberoptic wavelength multiplexer 14 is used to direct this light through a polarization scrambler 20 to allow a complete mixing between the two polarization states and then the light is detected with a photodiode . The resulting signal FM signal at $V_p$ is then demodulated using a standard FM demodulation apparatus 24.

EXAMPLE

Figure 2:
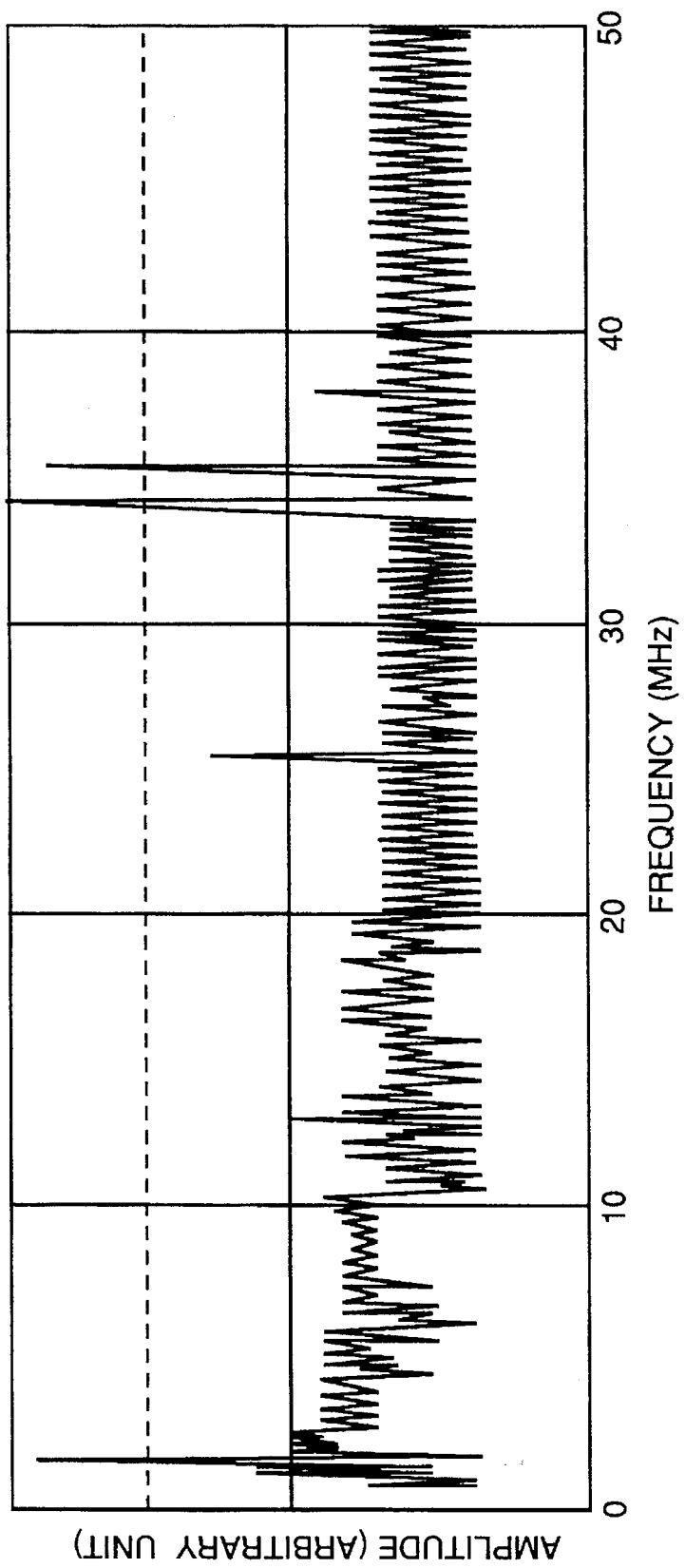
FIG. 2 is a graph representing the polarization beat frequency with the ultrasound field turned off, the peak shown represents the beat frequency between orthogonally polarized modes caused by residual stress in the microchip.
Figure 3:
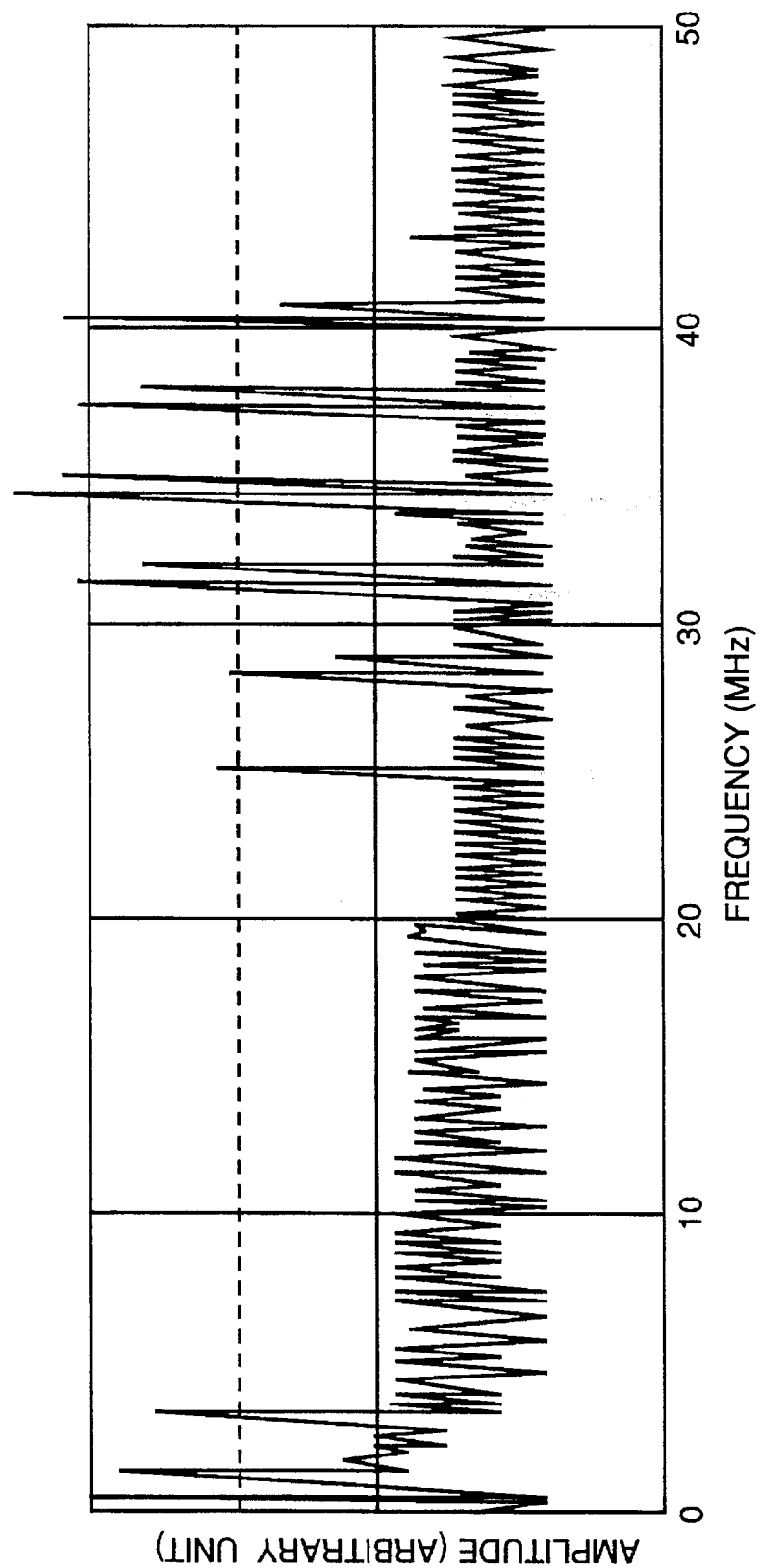
FIG. 3 is a graph representing the beat frequency with the ultrasonic field turned on which shows that the ultrasound is causing frequency modulation of the polarization beat frequency.

An Nd:YAG microchip laser was placed in a mineral oil bath along with an acoustic transducer adjusted to create an ultrasonic field at the microchip. The bottom curves in FIGS. 2 and 3 show the frequency spectrum of the microchip laser measured with a digital scope without and with the ultrasonic field present respectively. In FIG. 2 one can see a doublet peak at about 35 MHz. This corresponds to the polarization beat frequency $V_p$ due to residual stress in the microchip. The doublet nature of this peak is due to an artifact of the Fourier transform routine in the digital scope because it is not seen as a doublet with an analog spectrum analyzer.

In FIG. 3, with the ultrasonic field turned on, the beat frequency peak is split into at least 4 peaks equally spaced at the ultrasonic frequency of about 3 MHz. This is indicative of frequency modulation and shows that the ultrasound is causing frequency modulation of the polarization beat frequency.

The main advantage of this system and method for detecting an acoustic field is that the carrier frequency Vp can be tuned so that it is within the bandwidth of electrical FM demodulation systems. This is in contrast to the system and method described in the prior art above where a single frequency microchip laser is frequency modulated by an acoustic field where an optical Fabry-Perot demodulator must be employed. Specifically, the present invention requires FM to AM conversion or FM demodulation of an FM signal within electrical signal processing frequency bandwidth and therefore only requires electrical FM demodulation techniques. The prior detectors required FM to AM conversion or FM demodulation of an optical frequency FM signal therefore requiring optical FM demodulation techniques.

While the above has described methods utilizing a single microchip laser as an example, it should be understood that a plurality of microchip lasers can be operatively connected in an array combining two (2) to as many as twenty thousand (20,000) or more microchip lasers in order to provide a practical and effective acoustic detector. In this case, a like number of photodiodes would be required.

Microchip lasers in accordance with the present invention are advantageously used in acoustic energy imaging systems such as ultrasound systems used for medical imaging or for non-destructive evaluation of materials.

While the methods contained herein constitute preferred embodiments of the invention, it is to be understood that the invention is not limited to these precise methods, and that changes may be made therein without departing from the scope of the invention which is defined in the appended claims.

What is claimed is:

1. A method of detecting acoustic energy incident on a laser assembly comprising the step of:

oscillating a microchip laser at two different laser frequencies corresponding to two orthogonal polarizations wherein the frequency difference between the two laser frequencies is chosen to be within the bandwidth of an electrical signal processing system:

placing the microchip laser in an acoustic field, such that its cavity length is modulated which causes a frequency modulation of the frequency difference between the two laser frequencies: and mixing the two laser output polarizations using a polarization scrambling device and then detecting the output with a photodiode such that the resulting electrical signal contains the FM modulated beat frequency between the two polarization frequencies.

2. The method of claim 1 wherein the polarization scrambling device is a polarizer at about 45 degrees to the polarization axes.

3. The method of claim 1 further comprising the step of:

demodulating the resulting electrical signal containing the FM modulated beat frequency using an electrical signal processing system.

4. A method for performing ultrasound analysis of an object comprising the steps of:

generating an ultrasound pulse, the pulse being generated by the displacement of a lasing medium in a signal laser in response to applied energy;

communicating the ultrasound pulse into the object;

oscillating a microchip laser at two different laser frequencies corresponding to two orthogonal polarizations wherein the frequency difference between the two laser frequencies is chosen to be within the bandwidth of an electrical signal processing system wherein when the microchip laser is placed in an acoustic field, its cavity length is modulated which causes a frequency modulation of the frequency difference between the two laser frequencies;

processing an optical signal to generate a laser output signal corresponding to the detected reflections of the ultrasound pulse and demodulating the resulting electrical signal containing the FM modulated beat frequency using an electrical signal processing system.

5. The method of claim 4 wherein the laser output consisting of two different frequencies corresponding to two orthogonal polarization states is accomplished by applying stress to the microchip along a certain axis.

6. The method of claim 4 wherein the laser output consisting of two different frequencies corresponding to two orthogonal polarization states is accomplished by relying on any residual stresses that may be present in the microchip laser material.

7. The method of claim 4 wherein the laser output consisting of two different frequencies corresponding to two orthogonal polarization states is accomplished by adding a birefringent material as part of a composite microchip laser cavity.

8. The method of claim 5 wherein when the two laser output polarizations are mixed using a polarization scrambling device and then detected with a photodiode, the resulting electrical signal contains the FM modulated beat frequency between the two polarization modes.

9. The method of claim 8 wherein the polarization scrambling device is a polarizer at about 45 degrees to the polarization axes.

* * * * *